Feb. 15, 1955  H. J. HAMMERLY ET AL  2,701,894
METHOD AND APPARATUS FOR FORMING PANEL UNITS
Filed Sept. 9, 1950  2 Sheets-Sheet 1
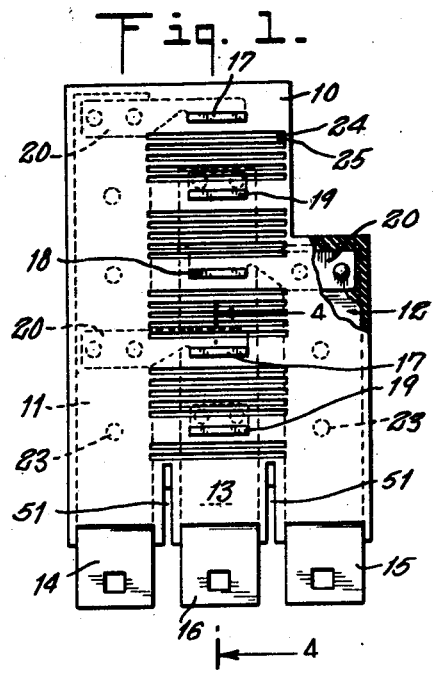
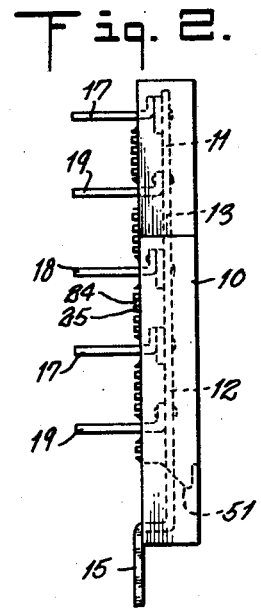
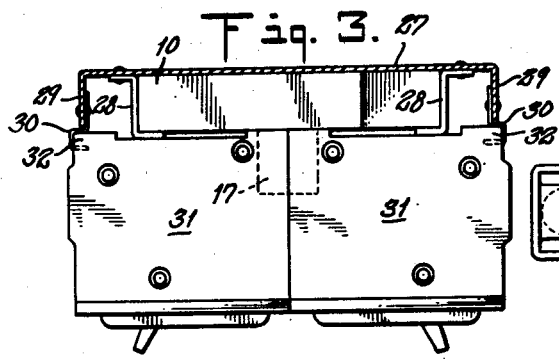
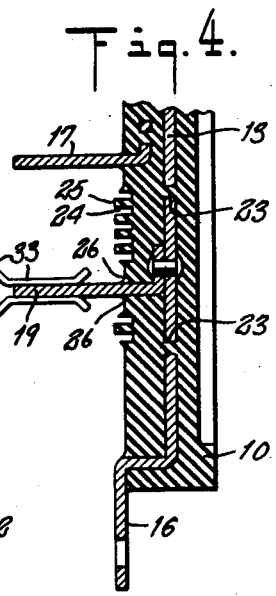
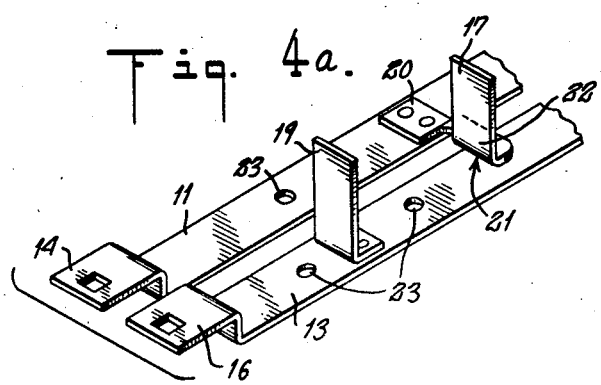
INVENTORS
HERMAN J. HAMMERLY
ROBERT T. CASEY
BY WILFRED H. YEAMANS
THEIR ATTORNEY Feb. 15, 1955   H. J. HAMMERLY ET AL   2,701,894
METHOD AND APPARATUS FOR FORMING PANEL UNITS
Filed Sept. 9, 1950   2 Sheets-Sheet 2
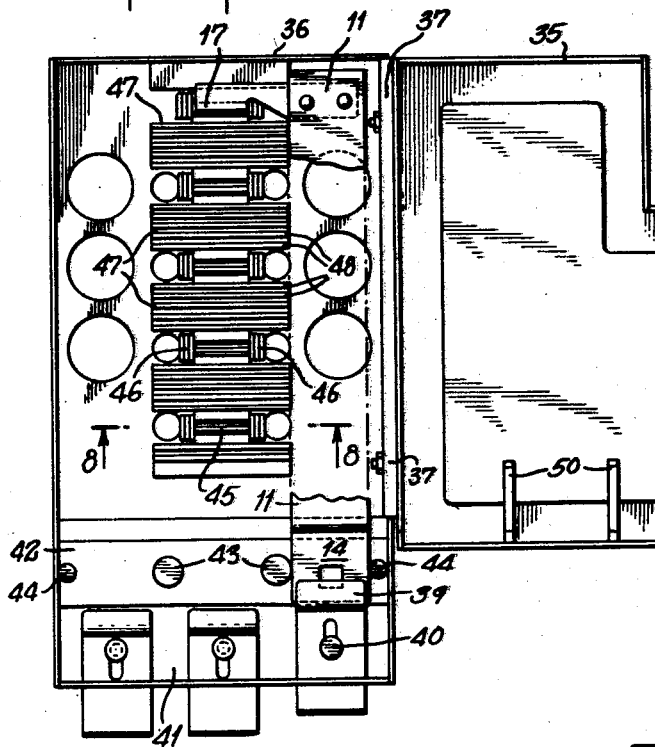
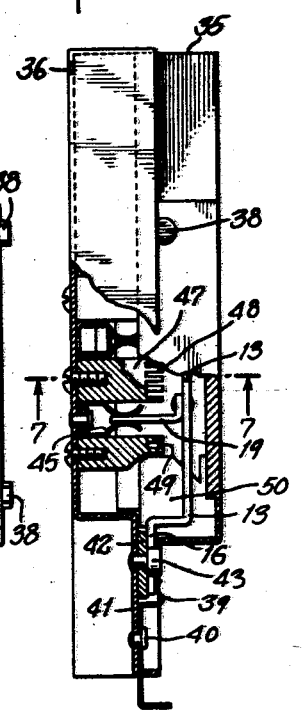
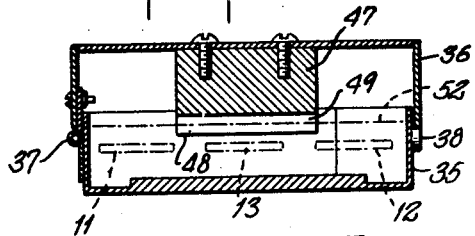
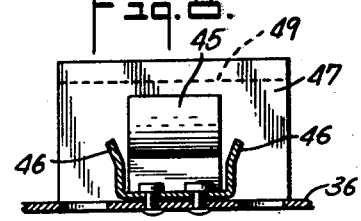
INVENTORS
HERMAN J. HAMMERLY
BY ROBERT T. CASEY
WILFRED H. YEAMANS
THEIR ATTORNEY

United States Patent Office 2,701,894
Patented Feb. 15, 1955

2,701,894

METHOD AND APPARATUS FOR FORMING PANEL UNITS

Herman J. Hammerly, Plainville, Robert T. Casey, Bristol, and Wilfred H. Yeamans, Plainville, Conn., assignors, by mesne assignments, to General Electric Company, a corporation of New York Application September 9, 1950, Serial No. 184,087

9 Claims. (Cl. 18—36)

The present invention relates to the production of panel units for electrical distribution systems. More particularly, the present invention relates to method and apparatus for producing a panel unit of the type disclosed and claimed in copending application Serial Number 274,749, filed by William J. Fleming on March 4, 1952, assigned to the same assignee as the present invention and which is a continuation in part of application Serial Number 184,759, filed September 14, 1950, and now abandoned and in copending application Serial Number 273,473, filed by Herman J. Hammerly et al. on February 26, 1952, assigned to the same assignee as the present invention which is a continuation of application Serial Number 184,086 filed September 9, 1950, and now abandoned. As disclosed in the aforesaid applications, such a panel unit comprises a body formed of molded insulating material having bus bars embedded in the insulation and having circuit terminals exposed at one or both ends and contact blades projecting from the surface of the body for supporting electrical devices such as circuit breakers.

One object is to provide a method for producing a molded panel unit, which method is extremely simple and involves a minimum number of steps or operations.

Another object is to provide simple, reliable and inexpensive apparatus for producing a panel unit of this type and which apparatus can be made by simple manufacturing techniques.

Another object is to provide apparatus for producing a panel unit of this type, which apparatus will assure the accurate spacing and location of the conductors when embedded in insulation.

Another object is to provide means for producing a panel unit of the type described which will assure that all spaces and voids between interlaced conductor assemblies will be completely filled with plastic insulation and devoid of air bubbles.

A further object is to provide means for raising ribs or ridges above the surface of the insulating body of such a panel unit without the necessity of complicated molding techniques and without entrapment of air.

The accompanying drawings illustrate the preferred form of panel unit and the mold for carrying out the method of production.

Fig. 1 is a front view and partial section showing a panel unit construction in accordance with the above Fleming and Hammerly applications and produced by the method and apparatus of our invention.

Fig. 2 is an edge view of the unit of Fig. 1.

Fig. 3 is a plan view of the panel unit installed on a supporting pan and showing two circuit breakers and the method of supporting the same when in use.

Fig. 4 is a sectional view showing a fragment of the panel unit together with a knife blade contact carried by a circuit breaker shown in their assembled relation when in use.

Fig. 4a is a perspective view showing the arrangement of two of the bus bars.

Fig. 5 shows the mold member 35 and its relation to the holding mechanism 36 for holding the bus bars during the immersion step.

Fig. 6 is a side elevation and partial section of the mold member and the bus bar holding mechanism in closed position with a bus bar in place but with no liquid in the mold.

Fig. 7 is a transverse sectional view showing the tray and the bus bar carrying holder in closed position and with liquid level indicated.

Fig. 8 is a fragmentary sectional view on the plane of the line 8—8 of Fig. 5 showing the spring clamp for holding the bus bars during the immersion step.

Fig. 9 is a fragmentary sectional view showing the way capillary action produces the ribbed and grooved area at the surface of the body.

The body 10 is preferably formed of an elastomeric compound in which are embedded bus bars 11, 12 and 13. The wiring terminals or terminal portions 14, 15 and 16 extend from the end of the body. Each bus bar has a contact blade or terminal portions such as 17, 18 and 19 mechanically and electrically connected to it. These intermediate terminal portions are all arranged in a single column. For that purpose each blade of a side bar has a foot 20 and is offset from the center bar leaving a space 21 between the foot of the blade 17 and the adjoining bus bar such as 22. Each of the bus bars is preferably provided with openings such as 23 to permit the liquid which is to enclose the bus bars to pass through and thus facilitate embedding the bus bars in plastic insulation. The surface of the insulation between adjacent blades as shown in Fig. 4 is provided with grooves 24 and ribs 25 during the molding process in a manner to be described.

When in use the body of the panel unit is supported in any suitable manner in a pan or tray 27. In this instance the body is held in the tray by one or more Z-shaped brackets 28 on each side. This tray has side flanges 29, 29 which support spring clips 30.

The panel as preferably constructed accommodates two columns of circuit breaker units 31, 31 which may be of any suitable type. Each breaker unit has a lug or shoulder 32 at one edge adapted to interlock with one of the clips 30 and a branch terminal (not shown). Each circuit breaker unit also has a knife blade type terminal 33 adapted to be mounted upon one-half of one of the contact blades such as 17 as shown in Fig. 4 when the unit is in use.

The panel unit described above and shown in Figures 1 through 4a, including the circuit breaker 31, the mounting means and terminals therefor, forms a part of the subject matter disclosed and claimed in the above-mentioned Fleming and Hammerly applications and forms no part of our present invention, and is shown herein only for the purpose of illustrating a specific product made by the novel method and apparatus which is the subject of our invention and which will now be described.

The molding apparatus consists of the generally rectangular tray shaped mold 35 and the holder 36. These two parts are hinged together at 37 and a stop lug 38 is provided at the opposite side of the tray to act as a stop to hold the holder in proper position when the holder is closed. The holder is provided with clamps 39 mounted on a part 41 of the holder and slidable by means of a slot and stud construction as shown at 40. One of these clamps is provided to slide over one of the bus bar wiring terminals so as to hold that end of the bus bar rigidly in place. The bus bar terminals rest upon a cross piece 42 and each is guided by studs such as 43 and 44.

A pair of spring jaws 45 carried by the holder member 36 is provided to receive and hold each contact blade of each of the side bus bars. A guiding piece 46 is provided on each side of the spring clamps. A member 47 is located in position between each pair of adjacent spring jaws. This member 47 has extending fins 48, 48 and spaces 49 between the adjacent fins.

The mold 35 is formed according to the desired shape of the finished insulating body and has partitions 50, 50 as shown in Fig. 5 which correspond in shape and location with the slots 51 to be formed in the finished body.

To form the finished body with embedded bus bars the mold 35 is filled with a liquid composition until it rises to the level of the dot and dash line 52 in Fig. 7.

The plastic composition which is to form the body of the completed article is formulated to provide a permanently solid but somewhat elastic base for the panel construction. This composition should have a quick-setting property of high insulating characteristics and a permanently stable construction. Such a composition may consist for instance of a vinyl resin such as vinyl chloride or a copolymer of vinyl chloride and vinyl acetate of about 37% combined with a resinous plasticizer such as polybasic acids esterified with polyhydric alcohols and styrene polymers of about 24%, a chemical plasticizer such as dioctyl phthalate, dibutyl phthalate, dihexyl phthalate, or similar type materials of approximately 19%, a stabilizer such as lead stearate, lead silicate, antimony oxide, lead phosphate, blue lead or mixtures thereof of about 9% and a suitable filler of for instance 11% calcium carbonate.

This composition at atmospheric temperature is poured in the tray 35 until it reaches the level of the dot and dash line 52. The holder member with the attached bus bars and their contact blades is then closed over the tray 35 until the outer flange 36 strikes the stop pin 38. In this closing movement the bus bars 11, 12 and 13 move angularly into the liquid which makes way for the bus bars to sink successively into the liquid which then surrounds and embeds them completely leaving the contact blades exposed. The edgewise movement of the bus bars due to the swinging action of the holder about the hinge edge 37 slides the bus bars smoothly successively into the liquid plastic and avoids the formation of air bubbles which might occur if an attempt was made to insert the bus bars flatwise into the liquid. At the same time the member 47 brings the fins 48 into the liquid which by capillary action rises between the fins 48. The entire construction is then placed in an oven and heated to a temperature of approximately 180 degrees centigrade and left in the oven for sufficient time to produce permanency of the body. The panel unit is thereafter removed from the molding apparatus in any suitable manner.

The preferred composition and the complete panel unit are claimed in our copending application Serial Number 273,473 filed February 26, 1952.

We claim:

1. In the manufacture of a panel unit comprising a body of plastic insulating material having embedded therein a plurality of bus bars with terminal portions projecting out of said body, the method comprising mounting a plurality of said bus bars in a holder by their projecting terminal portions so as to fix their relative positions, depositing a predetermined amount of said plastic insulating material in liquid form in an open tray-shaped mold, moving said holder toward and against said mold to a predetermined position so as to immerse said bus bars to a predetermined depth in said liquid with only said terminal portions projecting therefrom, bringing a plurality of closely spaced parallel fins to a position in contact with the surface of said liquid between the adjacent projecting terminal portions thereby to cause said liquid to rise by capillary action between said fins above the level of the liquid in said mold, and transforming the liquid into a solid mass while maintaining said holder and fins in said positions thereby to embed said bus bars completely in said mass except for said projecting terminal portions and to form raised ridges of insulating material between said terminal portions.

2. In the manufacture of a panel unit comprising a body of insulating material having embedded therein a plurality of closely spaced strap-like bus bars arranged in generally flat side-by-side alignment with terminal portions projecting out of said body in a direction generally at right angles to the surface of said body, the method comprising the steps of releasably mounting a plurality of said bus bars in a holder by their projecting terminal portions so as to maintain said bus bars in substantially flat side-by-side alignment, depositing a predetermined amount of said plastic insulating material in liquid form in an open tray-shaped mold, pivoting said holder about a side of said holder parallel to the length of said bus bars to cause said bus bars to enter said liquid along an arcuate path in succession and at an angle to the surface of said liquid, and transforming said liquid into a solid mass so as to embed said bars completely in said plastic except for said terminal portions, pivoting the holder to release the terminal portions and removing the unit from said mold.

3. For use in the manufacture of a panel unit comprising a body of plastic insulating material having embedded therein a plurality of elongated bus bars with terminal portions projecting out of said body, apparatus comprising an open tray-shaped mold adapted to receive and hold a predetermined amount of plastic insulating material in liquid form, a holder for said bus bars having a plurality of sets of clamping means for receiving and releasably holding the terminal portions of a plurality of said bus bars so as to maintain said bus bars in parallel and in predetermined relative positions, and means supporting said holder for movement along an arcuate path having an axis parallel to said bus bars toward said mold so as to cause said bus bars to enter said mold in succession and at an angle to the plane of the bottom of the mold, and cooperating stop means carried by said holder and said mold for limiting the arcuate movement of said holder.

4. For use in the manufacture of a panel unit comprising a body of plastic insulating material having embedded therein a plurality of bus bars with terminal portions projecting out of said body, apparatus comprising a generally rectangular open tray-shaped mold adapted to receive and hold a predetermined amount of plastic insulating material in liquid form, a holder for said bus bars having a plurality of sets of clamping means for receiving and releasably holding the terminal portions of a plurality of said bus bars so as to maintain said bus bars in predetermined relative positions, a hinge connection between said holder and said mold providing for pivotal movement of said holder over said mold to a closed position substantially parallel with the bottom of said mold, said bus bar clamping means being arranged to hold said bus bars within said mold in a plane parallel to the bottom of said mold when said holder is in said closed position, and stop means carried by said holder and said mold for limiting said closing movement of said holder.

5. For use in the manufacture of a panel unit comprising a body of plastic insulating material having embedded therein a plurality of bus bars with terminal portions projecting out of said body, apparatus comprising an open tray-shaped mold adapted to receive and hold a predetermined amount of plastic insulating material in liquid form, a holder movable with respect to said mold to an assembled position, a plurality of sets of clamping means on said holder for clamping a plurality of bus bar terminal portions in predetermined relative positions, guides associated with each set of said clamping means for centering said terminal portions in said clamping means, grooved members carried by said holder between adjacent of said sets of clamping means, and cooperating means carried by said holder and said mold for positioning said holder with respect to said mold in said assembled position, said grooved members being adapted to contact said liquid plastic material in said mold so as to form ridges on the surface thereof when said holder is in said assembled position.

6. For use in the manufacture of a panel unit comprising a body of plastic insulating material having embedded therein a plurality of bus bars with terminal portions projecting out of said body, apparatus comprising an open tray-shaped mold adapted to receive and hold a predetermined amount of plastic insulating material in liquid form, a holder movable with respect to said mold to an assembled position, a plurality of sets of spring jaws on said holder for holding a plurality of bus bar terminal portions in predetermined relative positions, a plurality of guides on said holder associated with each of said sets of spring jaws for centering said bus bar terminal portions in said jaws, a plurality of closely-spaced fin members on said holder between adjacent of said sets of spring jaws and cooperating means carried by said holder and said mold for positioning said holder with respect to said mold when in said assembled position, said fin members being adapted to contact the surface of said liquid plastic material in said mold when said holder is in said assembled position.

7. For use in the manufacture of a panel unit comprising a body of plastic insulating material having embedded therein a plurality of bus bars with terminal portions projecting out of said body, apparatus comprising a generally rectangular open tray-shaped mold adapted to to receive and hold a predetermined amount of plastic insulating material in liquid form so as to fill it to a predetermined level, a holder for said bus bars having a plurality of sets of clamping means for receiving and holding the terminal portions of a plurality of said bus bars so as to maintain said bus bars in predetermined relative positions, a plurality of closely-spaced fin members carried by said holder between adjacent sets of clamping means, a hinge connection between said holder and said mold providing for pivotal movement of said holder over said mold to a closed position substantially parallel with the bottom of said mold, said bus bar clamping means being arranged to hold said bus bars in a plane substantially parallel to the bottom of said mold when said holder is in said closed position, said fin members terminating substantially in a common plane parallel to the bottom of said mold and spaced away from the bottom of said mold a distance less than said liquid level thereby to cause said fin members to contact said liquid when said holder is in said closed position.

8. For use in the manufacture of a panel unit comprising a body of plastic insulating material having embedded therein a plurality of strap-like bus bars arranged in generally flat side-by-side alignment, each of said bus bars having an end wiring terminal offset flatwise and projecting from said body and intermediate terminal portions projecting from said body at right angles to the general plane of said body, apparatus comprising a generally rectangular open tray-shaped mold adapted to receive and hold a predetermined amount of plastic insulating material in liquid form, a holder for said bus bars having a plurality of sets of clamping means for releasably clamping said intermediate terminal portions so as to maintain said bus bars in substantially flat side-by-side alignment, a hinge connection between said holder and one side of said mold providing for pivotal movement of said holder to a closed position substantially parallel with the bottom of said mold, and stop means for limiting the movement of said holder with respect to said mold.

9. For use in the manufacture of a panel unit comprising a body of plastic insulating material having embedded therein a plurality of bus bars with offset end terminals projecting from said body and intermediate terminal portions projecting from the body, apparatus comprising a generally rectangular open tray-shaped mold having its sides substantially longer than its ends, and adapted to receive and hold a predetermined amount of plastic insulating material in liquid form so as to fill it to a predetermined level, upstanding partition members extending from one end of said mold in spaced apart relation so as to divide that end of said mold into three substantially equal portions, a holder having a plurality of sets of clamping means adapted to position and hold three of said bus bars substantially in a plane in flat side-by-side alignment, a plurality of spaced fin members on said holder between adjacent sets of said clamping means having their outer extremities lying substantially in a plane parallel to the plane of the bus bars, a hinge connection between said holder and a side of said mold providing for pivotal movement of said holder over said mold to a closed position substantially parallel with the bottom of said mold and with the end terminals of the bus bars between said partition members, and stop means for limiting movement of said holder in said closed position, said extremities of said fin members lying closer to the bottom of said mold than said liquid level and said clamping means lying substantially farther from the bottom of said mold than said liquid level when said holder is in said closed position.

References Cited in the file of this patent

UNITED STATES PATENTS

| | | |
|---|---|---|
| 618,671 | Heidt | Jan. 31, 1899 |
| 660,444 | Kribs | Oct. 23, 1900 |
| 1,837,962 | Hensgen | Dec. 22, 1931 |
| 2,136,609 | Butterfield | Nov. 15, 1938 |
| 2,237,274 | Hailes | Apr. 1, 1941 |
| 2,281,221 | Anderson | Apr. 28, 1942 |
| 2,298,156 | Person | Oct. 6, 1942 |
| 2,310,830 | Blair et al. | Feb. 9, 1943 |
| 2,351,529 | Luxenberger et al. | June 13, 1944 |
| 2,439,708 | Abraham | Apr. 13, 1948 |